E. M. HEYLMAN.
PLOW.
APPLICATION FILED JAN. 16, 1917.
1,262,949.
Patented Apr. 16, 1918.
5 SHEETS—SHEET 4.
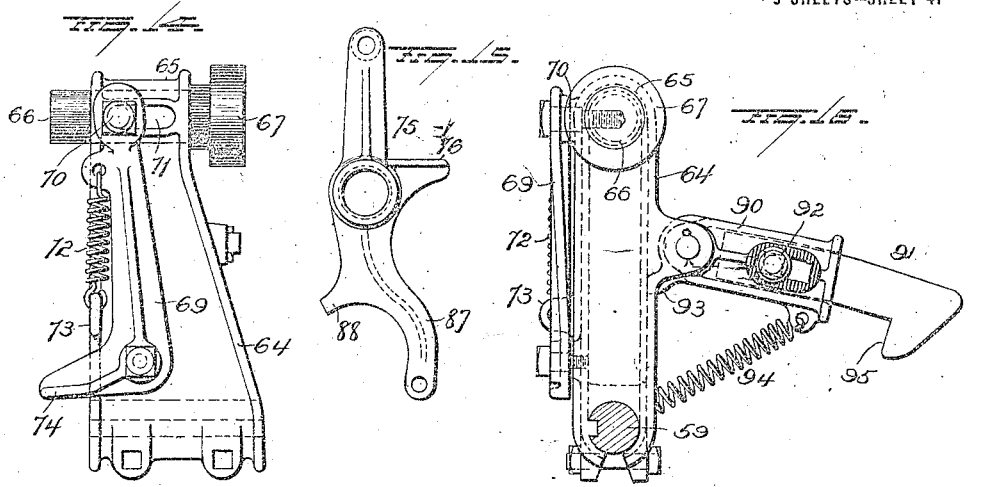
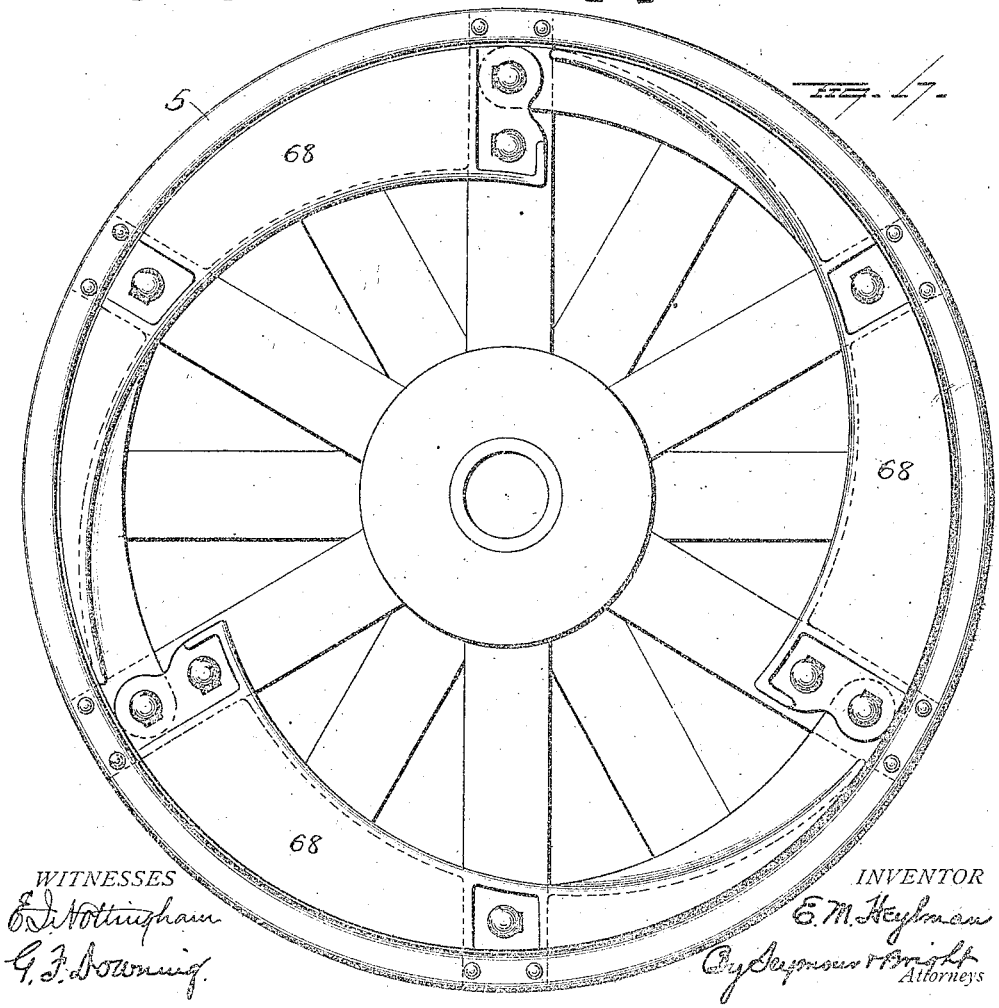
WITNESSES
INVENTOR
E. M. Heylman

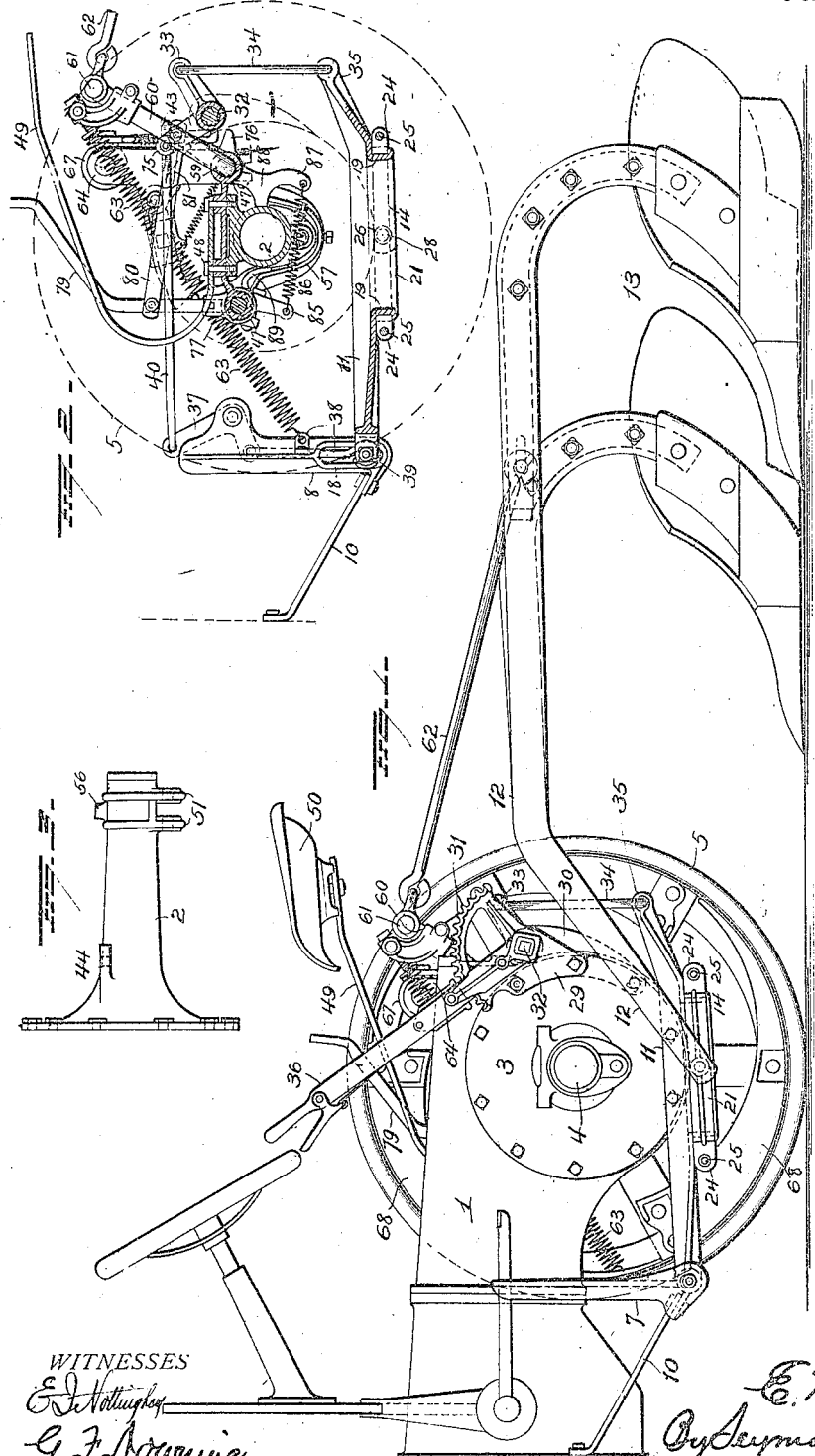

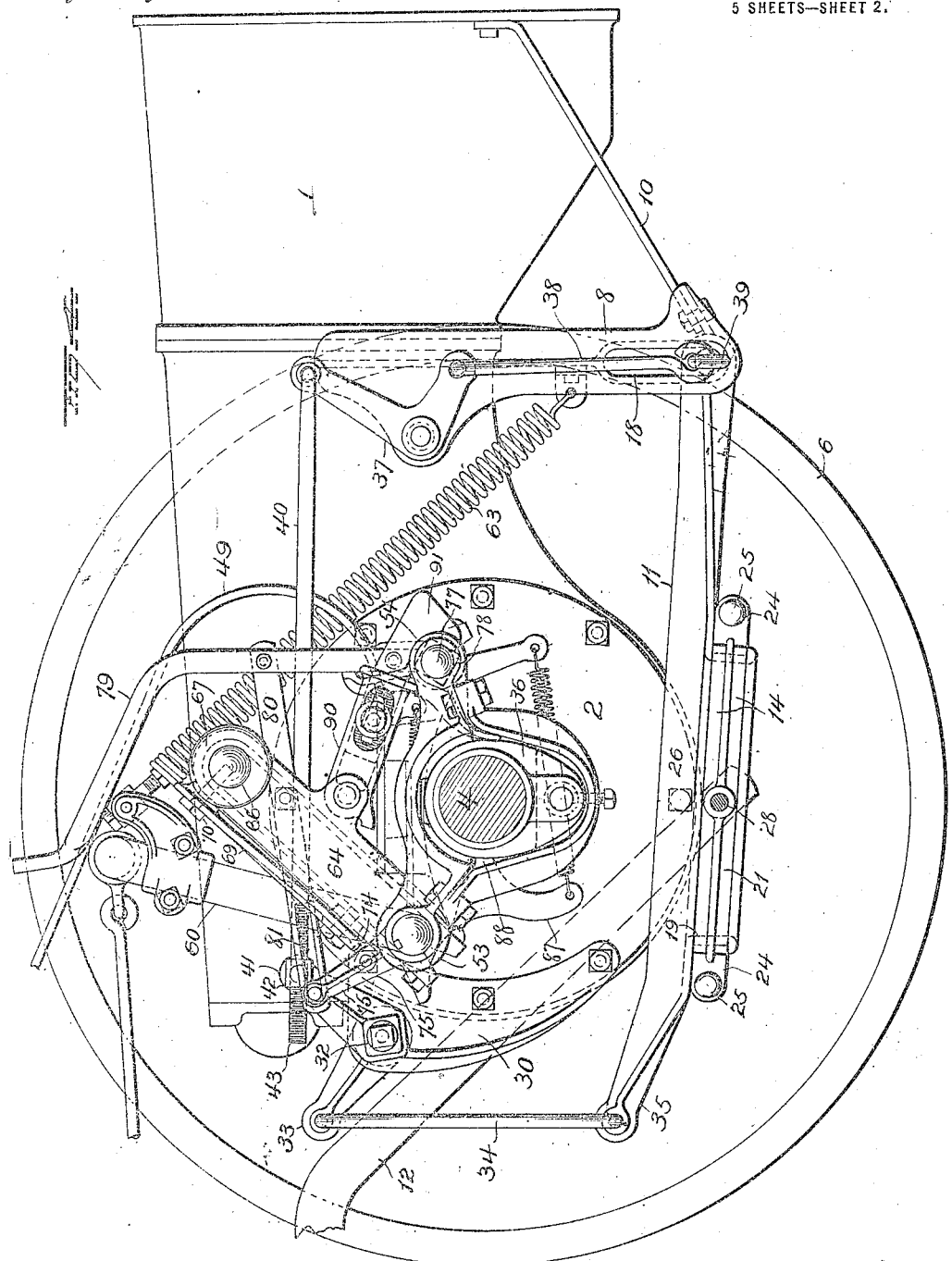

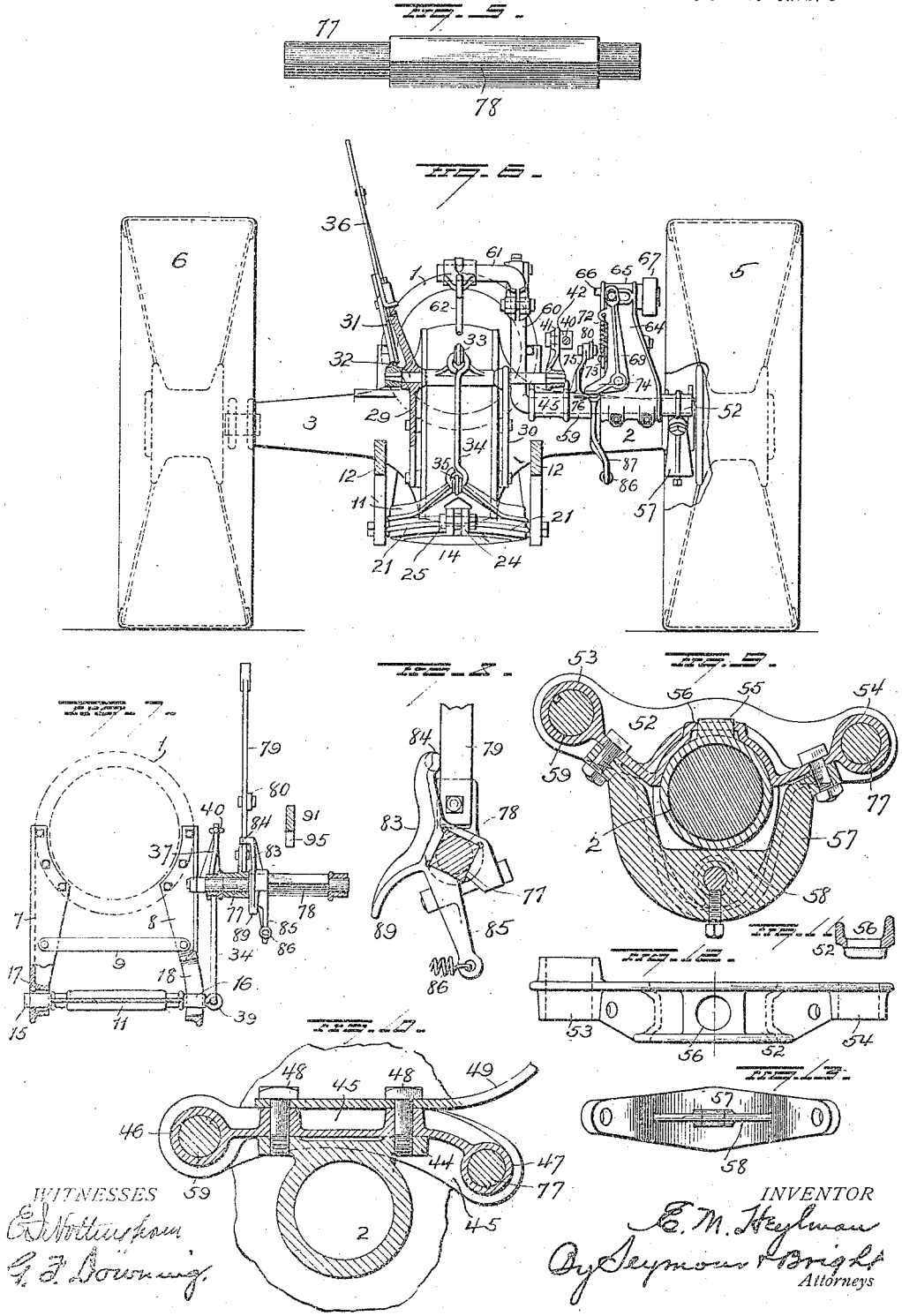

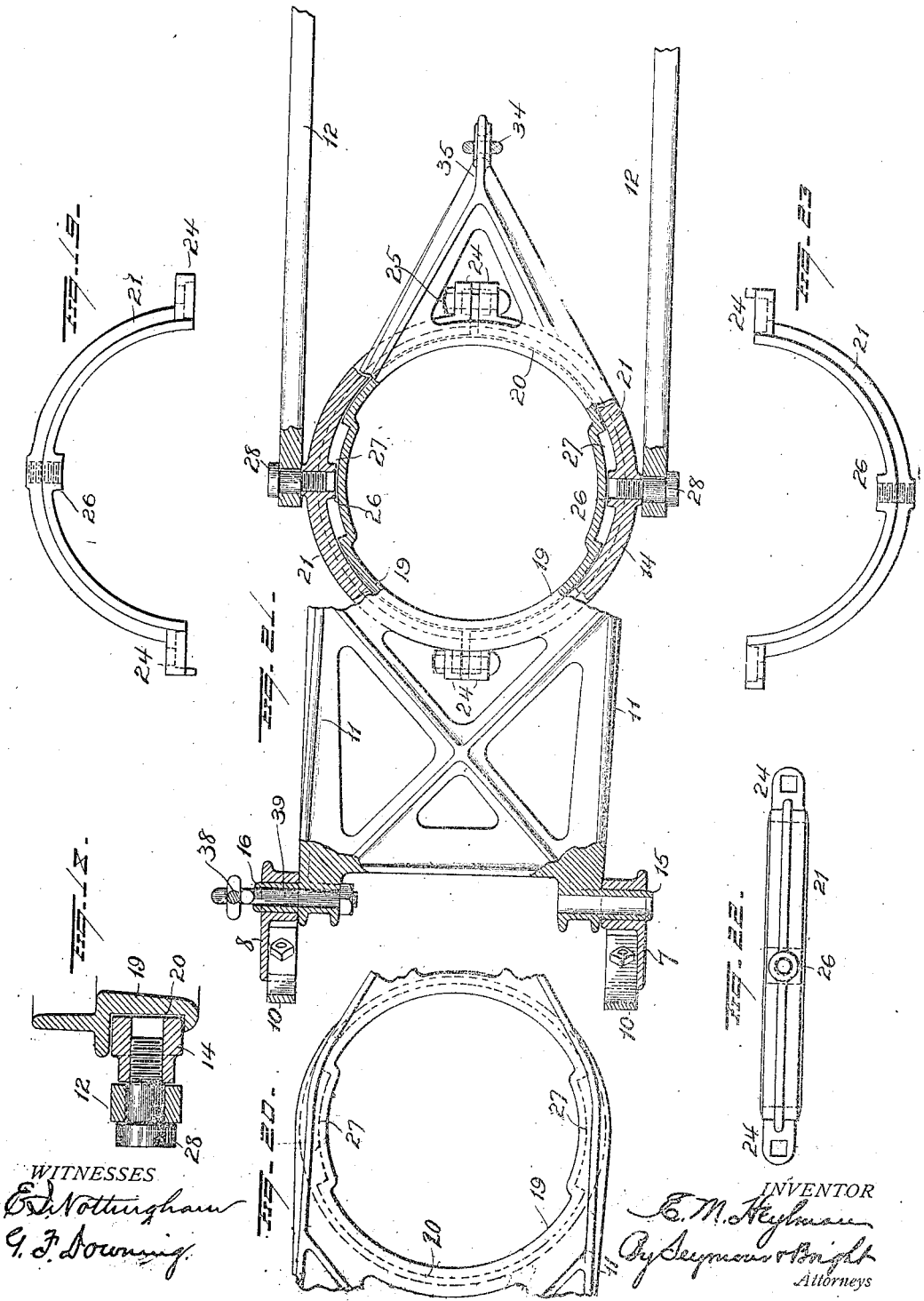

UNITED STATES PATENT OFFICE.

EDWARD M. HEYLMAN, OF SOUTH BEND, INDIANA, ASSIGNOR TO OLIVER CHILLED PLOW WORKS, OF SOUTH BEND, INDIANA.

PLOW.

1,262,949.  Specification of Letters Patent.  Patented Apr. 16, 1918.

Application filed January 16, 1917. Serial No. 142,677.

*To all whom it may concern:*

Be it known that I, EDWARD M. HEYLMAN, a citizen of the United States, and a resident of South Bend, in the county of St. Joseph and State of Indiana, have invented certain new and useful Improvements in Plows; and I do hereby declare the following to be a full, clear, and exact description of the invention, such as will enable others skilled in the art to which it appertains to make and use the same.

This invention relates to improvements in plows and more particularly to such as are associated with a tractor and known in the art as engine gang plows.

One object of my present invention is to provide simple and efficient means which will facilitate the turning of the plow without removing the same from the ground.

A further object is to so construct and arrange the connections between the plow and the tractor that the plow will, while in the ground, properly trail when the tractor is turned or run in a curved direction, without imparting lateral strain to such connections or to the tractor.

A further object is to so connect the plow with the tractor that a pivotal connection having a vertical axis will be afforded approximately under the rear axle of the tractor.

A further object is to provide a draft device between the plow and tractor, embodying a horizontal disposed turntable disposed approximately under the rear axle of the tractor and with which the plow is pivotally connected.

A further object is to so construct a draft device between a plow and a tractor, that both horizontal and vertical pivotal connections shall be afforded for the plow approximately under the rear axle of the tractor.

A further object is to provide simple and efficient power lift mechanism operable from a wheel of the tractor.

A further object is to provide efficient means for controlling the operation of the power lift mechanism.

A further object is to so construct latch mechanism for holding the plow in elevated position, that the same shall be made sure and accurate in operation to latch the plow in elevated position, and easy to operate to release the plow.

With these and other objects in view, the invention consists in certain novel features of construction and combinations of parts as hereinafter set forth and pointed out in the claims.

In the accompanying drawings; Figure 1 is a side elevation of an engine gang plow structure showing the parts as viewed from the landside of the structure; Fig. 2 is a view, partly in section, with the tractor removed; Fig. 3 is a detail of the rear axle bearing; Fig. 4 is an enlarged view, with the tractor axle in section, showing the positions of the parts when the plow gang is elevated; Fig. 5 is a detail view of the latch shaft; Fig. 6 is an end view partly in section; Figs. 7, 8, 9, 10, 11, 12, 13, 14, 15 and 16 are detail views showing various details of construction; Fig. 17 is an enlarged view of the tractor wheel which carries means for actuating the power lift mechanism; and Figs. 18, 19, 20, 21, 22 and 23 are detail views showing the draft bail structure and connections.

1 represents the rear portion of a tractor, to which the casings 2—3 are secured for inclosing portions of the driving gearing (now shown) and for providing mountings for the rear axle 4 to which the rear tractor wheels 5, 6 are connected.

Brackets 7 and 8 are secured to the frame of the tractor forwardly of the axle and depend from said frame, said brackets being spaced apart as shown in Fig. 7 and connected by a brace bar 9. Braces 10 are secured to the lower ends of the brackets and to the tractor forwardly of said brackets, as shown in Figs. 1, 2 and 4.

The forward end of a draft bail 11 is pivotally connected with the depending brackets 7, 8 and projects therefrom rearwardly under the rear axle of the tractor to receive the beam members 12, 12 of a plow gang 13,—the connection of said beams with the bail being effected through the medium of a turntable 14 carried by the bail approximately under the rear axle of the tractor, all as more specifically hereinafter explained.

In effecting the pivotal connection of the forward end the bail 11 with the brackets 7, 8, the bail is provided with lateral pintles 15, 16 to enter openings 17, 18 in the lower portions of the brackets 7, 8. The opening 17 in which the pintle 15 has its bearing at the lower end of the bracket 7 may be circular and of such size that the pintle 15 shall fit loosely therein, while the opening 18 into which the pintle 16 enters, is made in the form of an elongated slot, and the lower portion of the bracket 8 is curved somewhat so that the slot therein shall be segmental in form. From this construction, it will be apparent that the bail may be tilted in such manner as to permit the leveling of the plow gang connected therewith.

The draft bail 11 is provided intermediate of its ends with a circular portion 19 having an annular groove 20 in which the turntable 14 is mounted. The turntable may be conveniently made in two semicircular sections 21—21 (Figs. 19 and 23), provided at their ends with lugs 24 through which securing bolts 25 are passed, as clearly shown in Fig. 21. The respective sections of the turntable are provided intermediate of their ends with interiorly threaded bosses 26 and the inner ends of these bosses enter grooves 27 formed in the periphery of the circular mounting 19 to serve as limit stops for the turntable. Headed studs 28 are screwed into the bosses 26 and to the projecting ends of these studs, the forward ends of the beam members 12 of the plow gang are pivotally connected.

It will be observed that with the construction and arrangement of parts as hereinbefore described, the plow is connected with a pivoted draft bail in such manner that two pivotal connections of said plow with the bail are effected under the rear axle of the tractor, and that said pivotal connections are disposed at right angles to each other,—the turntable affording a pivotal connection having a vertical axis permitting lateral movement of the plow relatively to the tractor, and the attachment of the beam members 12 with the turntable affording a pivotal connection having a horizontal axis permitting the plow to be raised. With such connection of the plow with the bail under the rear axle of the tractor, uniformity of depth of plowing will be enhanced and the proper trailing of the plow behind the tractor when a turn is made with the plow bases in the ground, will be insured without subjecting the tractor or the plow and its connections with the tractor, to lateral strains.

Brackets 29, 30 are secured to the mountings of the rear axle and approximately central between the rear wheels,—the bracket 29 being formed at its upper end with a toothed segment 31, as shown in Fig. 1. A shaft 32 is mounted in the brackets 29, 30 and provided with a rearwardly projecting arm 33 connected, by means of a rod 34 with the V-shaped rear end 35 of the draft bail 11. A hand lever 36 is secured to the shaft 32 and provided with a suitable detent to engage the toothed segment 31. By operating the lever 36, the draft bail may be moved vertically and the plow gang thus adjusted for depth of plowing.

A bell crank lever 37 is pivotally mounted on the bracket 8 and the lower arm of this bell crank is connected with the vertically movable pintle 16 at the forward right hand corner of the bail by means of a rod 38. In effecting such connection, a bolt 39 is mounted in the tubular pintle 16 (Fig. 21) and provided at its outer end with an eye to receive a similar eye at the lower end of the rod 38. The upper arm of the bell crank 37 is connected, by means of a rod 40 with an arm 41 projecting upwardly from the shaft 32. In effecting the connection between the rod 40 and arm 41, an interiorly threaded sleeve 42 pivotally mounted on the arm 41 for the passage of the threaded portion 43 of said rod, thus providing an adjustable connection between the rod and arm. With such construction, the operation of the lever 36 to adjust the plows for depth of plowing, will also cause one side of the draft bail to be raised and in this manner the plows may be leveled and adjusted for depth of plowing, simultaneously with the use of a single operating lever.

The casing 2 of the mounting for the rear axle of the tractor, is provided near one end with a seat 44 for a cross head 45 having shaft bearings 46, 47 at its respective ends, as shown in Fig. 10. The cross head 45 may be secured to its seat by means of bolts 48 and these bolts also secure the lower end of a seat spring 49 on the cross head,—the upper end of said spring having an operator's seat 50 secured thereto, as shown in Fig. 1.

The casing or axle mounting 2 is provided near its outer end, in proximity to the wheel 5 of the tractor, with ribs 51 which depend somewhat from said casing (Fig. 3) and upon this end portion of the casing or mounting 2, a cross head 52 is mounted and provided at its respective ends with shaft bearings 53, 54. A lug 55 on the casing 2 enters a hole 56 in the cross head 52 to prevent the latter from turning and said cross head is secured in place by means of a yoke 59 bolted to the cross head (Figs. 4 and 9) and provided with a rib 58 to enter between the ribs 51 on the casing 2 and bolted thereto.

A shaft 59 is mounted in the bearing 46—53 and provided at one end with an upwardly projecting crank arm 60 having a lateral arm 61 at its free end. A rod 62 is pivotally connected at its forward end with the lateral arm 61 of the crank shaft and at its rear end; said rod is pivotally connected with the plow gang 13, intermediate the ends thereof. A balancing spring 63 for the plow gang is connected at one end to the arm 60 of the crank shaft and at its other end, said spring is attached to a fixed part of the structure, as to the bracket 8, as shown in Figs. 2 and 4.

Mechanism is provided for operating the crank shaft by power from one of the rear wheels of the tractor to raise the plow gang, and means are also provided for controlling the operation of said mechanism; for latching the gang in elevated position, and for releasing said gang: all of which will now be explained in detail.

An arm or lever 64 is rigidly secured to the crank shaft 59 and is provided at its upper end with a transverse or horizontal bearing 65 for a short shaft or pin 66 carrying a roller 67 or engaging device at one end to coöperate (under certain conditions) with any one of a series of cams 68 secured to the inner side of the tractor wheel 5 inwardly of the rim or tread portion of said wheel. A lever 69 is pivotally mounted on the arm 64 and at its upper end, said lever is connected with a pin 70 secured to the short shaft or pin 66 and passing through an elongated seat 71 in the bearing 65 of said short shaft or pin. A spring 72 attached at one end to the upper portion of the lever 69 and at the other end to a projection 73 on the arm 69, serves normally to maintain the roller 67 out of the path of the cams 68 on the tractor wheel 5. At its lower end, the lever 69 is provided with a lateral finger 74, and a lever 75 mounted loosely on the shaft 59 is provided with a shoulder or projection 76 to engage said finger.

A shaft 77 is mounted in the bearings 47 and 54 of the cross heads 45 and 52, and a portion of this shaft is made angular (preferably square in cross section) as shown at 78 in Figs. 5, 7 and 8. An operating lever 79 is mounted loosely on the shaft 77 (Figs. 4 and 8) and is so formed as to be within convenient reach of the operator. A link 80 is pivoted at one end to the lever 79 and the opposite end portion of this lever is provided with a slot 81 which receives a pin 82 at the free upper end of the lever 75. A lever 83 is also secured to the shaft 77—78 and is provided with an upwardly projecting arm 84 which bears against the operating lever 79. The lever 83 is also provided with a depending arm 85 with which one end of a spring 86 is connected,—the other end of said spring being connected with an arm 87 depending from the lever 75. This spring serves to retain the levers 75, 84 and 79 in and to return the same to their normal positions,—such normal positions being accurately assured by means of a stop 88 on the arm 87 of lever 75 and a stop 89 on the lever 83, which stops engage the axle mounting 2 at respective sides thereof, as shown in Figs. 2 and 4. It will be understood that when the hand lever 79 is moved forwardly when the plow bases are in the ground, motion will be imparted, through the link 80, to the lever 75, thus causing the engagement of the shoulder or projection 76 with the finger 74 to move the lever 69 and cause the roller 67 to be projected into the path of the cams 68 on the tractor wheel 5. As the tractor moves forwardly the rotation of the tractor wheel will cause one of its cams 68,—by its coöperation with the roller 67,—to move the arm 64 forwardly and as this arm is secured to the crank shaft 59, the latter will be turned and its crank arm moved forwardly to impart motion, through the rod 62, to the plow gang and thus raise the latter on its pivotal connection with the turntable carried by the draft bail. When the plow gang shall have been thus raised to the upper extent of its movement, it will be latched in such elevated position by means of the instrumentalities which will now be explained.

A socketed member or arm 90 is pivotally attached to the arm 64 intermediate the ends thereof and carries a hook 91 which is adjustably secured to said member 90, as indicated at 92. The pivoted member 90 of the hook structure is supported normally in the position shown in Fig. 16 by the engagement of a stop 93 thereon with the arm 64 and is held in such position by the action of a spring 94. The hook is made with a flat face 95 to engage one of the flat faces of the angular portion 78 of the shaft 77, when the arm 64 moves forwardly during the raising of the plow gang as above described. It is apparent that when the hook 91 is in engagement with the squared portion 78 of the shaft 77, as shown in Fig. 4, the plow gang will be latched in its elevated position.

To release the plow gang for permitting the same to descend to working position, the operator will move the hand lever 79 rearwardly thus turning the angular shaft 78 and causing the hook to be released therefrom. The parts will then be free to move to the positions which they assume when the plow gang is at work.

Various changes might be made in the details of construction of my invention without departing from the spirit thereof or limiting its scope, and hence I do not wish to restrict myself to the precise details herein set forth.

Having fully described my invention what I claim as new and desire to secure by Letters-Patent, is:—

1. In an engine plow structure, the combination with a wheeled draft frame having projections on one of its wheels, a plow, and means pivotally connecting the plow with the wheeled draft frame, of a crank shaft mounted on the wheeled draft frame, means connecting said crank shaft with the plow, an arm secured to the crank shaft, a horizontal shaft carried by said arm, a roller on said horizontal shaft, a lever mounted on said arm and connected with said horizontal shaft, a lever loose on the crank shaft and having a shoulder for operating the first-mentioned lever, an operating lever, and connections between the operating lever and said loose lever.

2. In an engine plow structure, the combination with a wheeled draft frame having projections on one of its wheels, a plow, and means pivotally connecting said plow with the wheeled draft frame, of a crank shaft mounted on the wheeled draft frame and connected with the plow, an arm secured to the crank shaft, a laterally movable roller carried by said arm, a lever mounted on said arm for moving the roller into the path of the projections on the wheel of the wheeled draft frame, a lever loose on the crank shaft for operating said first-mentioned lever, a stop for the loose lever, a spring holding said loose lever in normal position, a spring holding the first-mentioned lever in normal position, an operating lever, and connections between the operating lever and said loose lever.

3. In an engine plow structure, the combination with a wheeled draft frame, projections on one of the wheels thereof, a plow, and means pivotally connecting the plow with the wheeled draft frame, of a crank shaft mounted on the wheeled draft frame and connected with the plow, a latch shaft mounted on the tractor, an arm secured to the crank shaft, an engaging device carried by said arm, a lever for moving said engaging device into the path of the projections on the wheel of the wheeled draft frame, a latch hook carried by said arm for engagement with the latch shaft, an operating lever secured to the latch shaft, a stop lever also secured to the latch shaft and engaging the operating lever, a lever loose on the crank shaft for operating the first-mentioned lever, a spring connecting the loose lever with said stop lever, and a connection between the loose lever and the operating lever.

4. In an engine plow structure, the combination with a wheeled draft frame, a plow, and means pivotally connecting the plow with the wheeled draft frame, of a crank shaft mounted on the wheeled draft frame and connected with the plow, an arm secured to the crank shaft, means for operating said arm from a wheel of the wheeled draft frame, a latch hook connected with said arm, a shaft having an angular portion to receive said hook, and an operating lever secured to said shaft for turning the same to release the latch hook.

5. In an engine plow structure, the combination with a wheeled draft frame, a plow, and means for pivotally connecting said plow with the wheeled draft frame, of a crank shaft mounted on the wheeled draft frame and connected with the plow, an arm secured to said crank shaft, means for operating said arm from a wheel of the wheeled draft frame, a socket member pivoted to said arm, a latch hook adjustably connected with said socket member, a latch shaft having an angular portion to be engaged by the latch hook, and means for turning said shaft to release the latch hook therefrom.

6. In an engine plow structure, the combination with a wheeled draft frame having a rear axle mounting, projections on a wheel of the wheeled draft frame, a plow, and means pivotally connecting the plow with the wheeled draft frame, of two cross heads secured to the rear axle mounting, parallel shafts mounted in said cross heads, one of said shafts constituting a latch shaft and the other having a crank arm, means connecting said crank arm with the plow, an arm secured to the cranked shaft, a roller carried by said arm, a lever for moving said roller laterally, a loose lever on the cranked shaft for operating the first mentioned lever, a latch hook carried by said arm to engage the latch shaft, an operating lever secured to the latch shaft, a link connected with said operating lever, and a pin-and-slot connection between said link and the loose lever on the cranked shaft.

In testimony whereof, I have signed this specification in the presence of two subscribing witnesses.

EDWARD M. HEYLMAN.

Witnesses:
EDWIN NICAR,
CHARLES A. WEBSTER.